(12) United States Patent
Powers

(10) Patent No.: US 12,530,990 B1
(45) Date of Patent: Jan. 20, 2026

(54) SYSTEM TO FACILITATE PARKING A VEHICLE STRAIGHT IN A DESIRED LOCATION INSIDE A GARAGE

(71) Applicant: Robert William Powers, Silver Spring, MD (US)

(72) Inventor: Robert William Powers, Silver Spring, MD (US)

( * ) Notice: Subject to any disclaimer, the term of this patent is extended or adjusted under 35 U.S.C. 154(b) by 0 days.

(21) Appl. No.: 18/923,935

(22) Filed: Oct. 23, 2024

Related U.S. Application Data

(63) Continuation-in-part of application No. 18/475,656, filed on Sep. 27, 2023.

(51) Int. Cl.
*G09F 7/00* (2006.01)

(52) U.S. Cl.
CPC ...................... *G09F 7/00* (2013.01)

(58) Field of Classification Search
CPC .......................................... G09F 7/00
See application file for complete search history.

(56) References Cited

U.S. PATENT DOCUMENTS

| | | | | |
|---|---|---|---|---|
| 1,311,253 A | * | 7/1919 | Stern | G01C 3/22 359/838 |
| 2,360,368 A | * | 10/1944 | Rubissow | B62D 15/00 33/264 |
| 4,441,259 A | * | 4/1984 | Leitermann | G01B 5/207 33/608 |
| 4,730,926 A | * | 3/1988 | Wedemeyer | B60R 1/06 356/138 |
| 4,941,263 A | * | 7/1990 | Hirshberg | G02B 27/0101 340/435 |
| 5,113,588 A | * | 5/1992 | Walston | B60D 1/36 280/477 |
| 5,224,270 A | * | 7/1993 | Burrus | B60D 1/36 356/399 |
| 5,500,773 A | * | 3/1996 | Easter | B60R 1/06 359/838 |
| 5,655,474 A | * | 8/1997 | Pretsch, Jr. | B60Q 1/48 116/28 R |
| 6,199,287 B1 | * | 3/2001 | Rankila | B60Q 1/48 116/28 R |
| 6,209,478 B1 | * | 4/2001 | Curtis | E04H 6/426 116/28 R |
| 6,496,259 B2 | * | 12/2002 | Barish | G01B 11/27 356/138 |

(Continued)

*Primary Examiner* — Kristina M Deherrera
*Assistant Examiner* — Tania Courson
(74) *Attorney, Agent, or Firm* — Michael L. Greenberg, Esq.; Greenberg & Lieberman, LLC

(57) ABSTRACT

An apparatus to be viewed by a driver to aid parking a car parallel to the walls of a garage, as well as the correct distance into the garage. The driver is able to park in exactly the same spot each time, at the desired distance from other cars, walls, or other stationary objects via the aid apparatus. This helps minimize banging car doors on objects upon opening, or bumping into anything in front of the vehicle, while maximizing use of space within the garage. The apparatus is installed in a fixed position in front of the driver at eye level as they sit comfortably in a driver's seat of the vehicle. As the driver drives their car into their garage to park, they are guided by visual cues from the apparatus to park the car in the same footprint on the floor each time.

13 Claims, 9 Drawing Sheets

(56) References Cited

U.S. PATENT DOCUMENTS

| | | | |
|---|---|---|---|
| 6,851,697 B2* | 2/2005 | Kinnard | B60D 1/36 |
| | | | 280/477 |
| 8,590,167 B2* | 11/2013 | Odom | G01C 23/005 |
| | | | 33/228 |
| 2025/0101763 A1* | 3/2025 | Powers | E04H 6/426 |

* cited by examiner

SYSTEM TO FACILITATE PARKING A VEHICLE STRAIGHT IN A DESIRED LOCATION INSIDE A GARAGE

CONTINUITY

This application is a continuation-in-part application of non-provisional patent application Ser. No. 18/475,656, filed on Sep. 27, 2023, and priority is claimed thereto.

FIELD OF THE PRESENT INVENTION

The present invention relates to the field of consumer vehicles, and more specifically relates to a system and apparatus which facilitates the consistent parking of a vehicle in a desired location of a garage each time it is parked. The desired location is preferably parallel to adjacent walls, obstacles, and vehicles while minimizing wasted space within the garage by achieving the desired distance from present obstacles, both on the sides and in front of the vehicle.

BACKGROUND OF THE PRESENT INVENTION

Homeowners who have single or multi-car garages have long had a problem with parking their vehicles in precisely the same spot every time. If the vehicle is too close to objects on either side, it will be difficult to open the vehicle doors as far as desired, resulting in hitting the adjacent objects or another vehicle, or preventing the door from being opened wide enough to allow a comfortable exit from or entrance to the vehicle.

Unfortunately, other products on the market, such as suspended tennis balls, stop signs that light up when touched, or rubber wheel stoppers, only prevent the driver from pulling too far into the garage, but do not help keep the vehicle aligned side-to-side. If there were a novel device which could provide a clear visual cue to the driver without employing electricity, which could inform the driver as to whether the vehicle is centered in a desired position of the garage, parking accuracy could be expedited and space in the garage could be maximized.

Thus, there is a need for a new device configured to quickly and easily inform the driver as to their present approach angle to a desired spot within a garage. Such a device is preferably configured to be mounted to a wall or stationary object in the garage in a precise location. The device is preferably equipped with at least two stripes, which, when shown in alignment with its surroundings, is configured to indicate the lateral and/or angular position of the vehicle such that the driver may make corrections to the vector of the vehicle before entering the garage too far, and therefore requiring the driver to re-park the vehicle.

Patent application Ser. No. 18/475,656 has been filed for an invention to help drivers park their vehicle in the desired position side-to-side. However, this invention does not help the driver park in the correct position front-to-back. The present invention adds that functionality to the previous invention. While there are other products on the market, such as suspended tennis balls, stop signs that light up when touched, or rubber wheel stoppers as previously mentioned, none of these incorporate the side-to-side parking assist feature as well.

SUMMARY OF THE INVENTION

The present invention is a passive visual aid for a driver to help them park their vehicle in precisely the same spot in their garage each time. It consists of two thin, flat pieces of material which are affixed together by columns of material that separate the two pieces by a short distance and holds them parallel to one another. Each piece is colored with a light background, and each has one or more thin brightly colored vertical stripes across or near the center. The colors preferably contrast as much as possible, and the stripes should be wide enough and the pieces large enough that they can be seen easily by the driver as they drive into the garage.

In addition, there is a horizontal stripe in a contrasting color at or near the center of each piece. The front piece has a hole in it, allowing the back piece to be visible through the hole. If the driver sees a single continuous bright vertical line(s) as they drive into the garage towards the device, then they are assured of parking their vehicle in the desired lateral location. If, however, the driver sees a broken or disconnected line as they drive towards the device, the vehicle position will not be correct, and can be adjusted by turning the vehicle slightly one way or the other until a solid, continuous vertical line is seen.

Once the side-to-side position is assured, the driver references the horizontal lines. There are adjustable horizontal stripes on the sides of the front plane which can be positioned, as the device is mounted, so that they line up with the rear horizontal line when the vehicle is in the desired position front-to-back. For use, the vehicle enters the garage until the driver sees a continuous horizontal line.

Optionally, two such adjustable horizontal lines may be provided to accommodate the needs of drivers of two different heights.

Optionally, the vertical line on the front panel may be adjustable to allow the device to be mounted off-center of the line of sight of the driver, in cases where this may be necessary, such as a doorway being in front of the vehicle.

The following brief and detailed descriptions of the drawings are provided to explain possible embodiments of the present invention but are not provided to limit the scope of the present invention as expressed herein this summary section.

BRIEF DESCRIPTION OF DRAWINGS OF THE PRESENT INVENTION

The accompanying drawings, which are incorporated herein and form a part of the specification, illustrate the present invention and, together with the description, further serve to explain the principles of the invention and to enable a person skilled in the pertinent art to make and use the invention.

The present invention will be better understood with reference to the appended drawing sheets, wherein:

FIG. 1 details a view of a preferred embodiment of the apparatus of the present invention as seen from the front and side in a perspective view FIG. 2 exhibits a view of the apparatus of the present invention as seen by the driver when the vehicle is correctly aligned as shown when the vehicle is parked in the correct spot, both side-to-side and front-to-back, denoted by the crossed solid lines.

FIG. 3 exhibits a view of the apparatus of the present invention as seen by the driver when the vehicle is parked correctly side-to-side but has not yet been positioned correctly front-to-back. The vertical line is solid but the horizontal line is broken.

FIG. 4 depicts a flow chart of the process of installation and use of the device of the present invention by a user.

FIG. 5A depicts an a view of the preferred embodiment of the present invention shown to the driver when the vehicle is parked in a position that is correct on both axes, front-to-back and side-to-side. This view is to be used when the apparatus must be mounted off center. The vertical sleeves (65) are adjusted during initial setup to show a solid horizontal line.

Figure 6A:
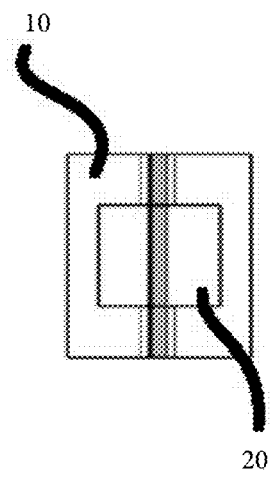

FIG. 6A depicts an alternate embodiment of the present invention, shown from the front, for use when the front-to-back functionality of the device is not practical, such as when drivers of different heights use the parking space. In this situation the horizontal line is absent. The vertical lines on the front plane can be fixed or adjustable.

Figure 6B:
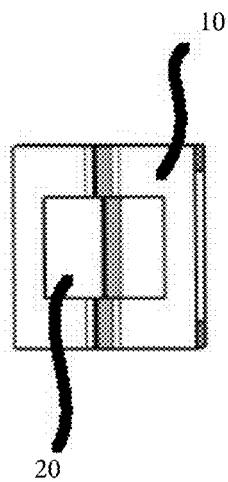

FIG. 6B depicts the alternate embodiment of the present invention, shown from the front and right side, at an angle, for use when the front-to-back functionality of the device is not practical, such as when drivers of different heights use the parking space.

Figure 6C:
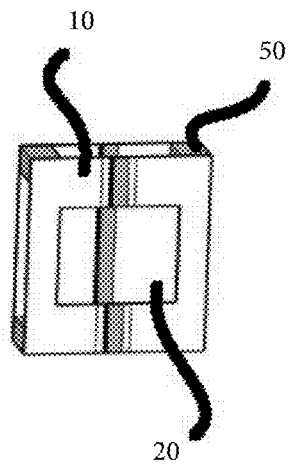

FIG. 6C depicts the alternate embodiment of the present invention, shown from the top left side, at an angle, for use when the front-to-back functionality of the device is not practical, such as when drivers of different heights use the parking space.

Figure 7:
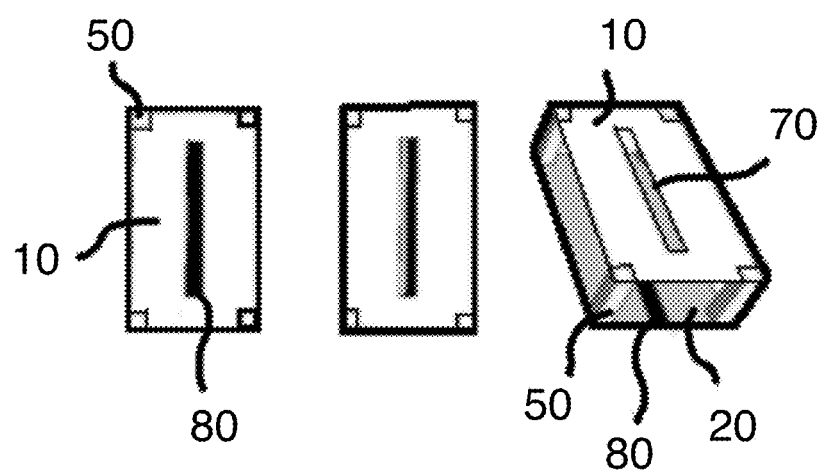

FIG. 7 depicts a second alternate embodiment of the present invention, shown with a slit-shaped cutout.

Figure 8:
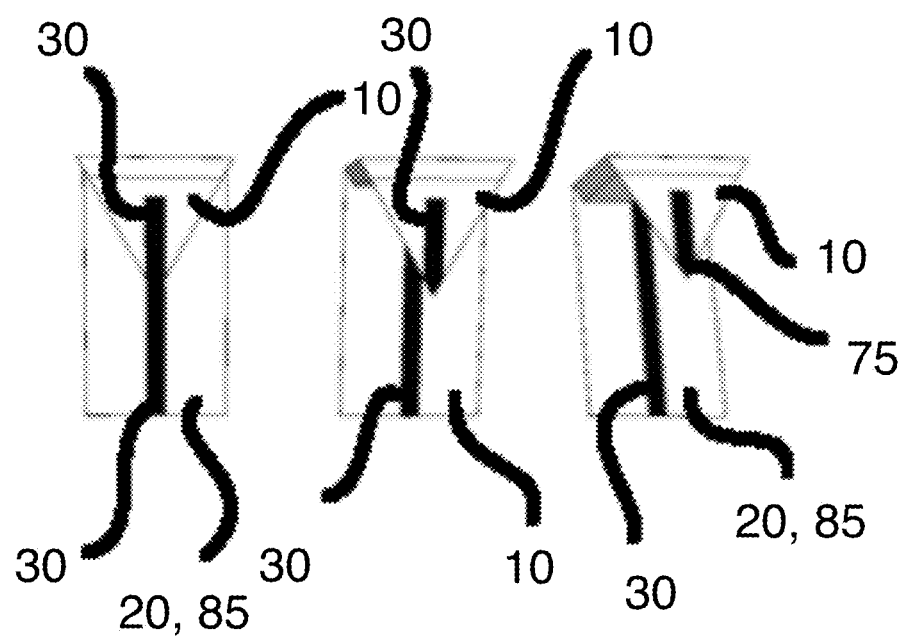

FIG. 8 shows a third alternate embodiment of the present invention, exhibiting a pointed tip on the front panel.

Figure 9:
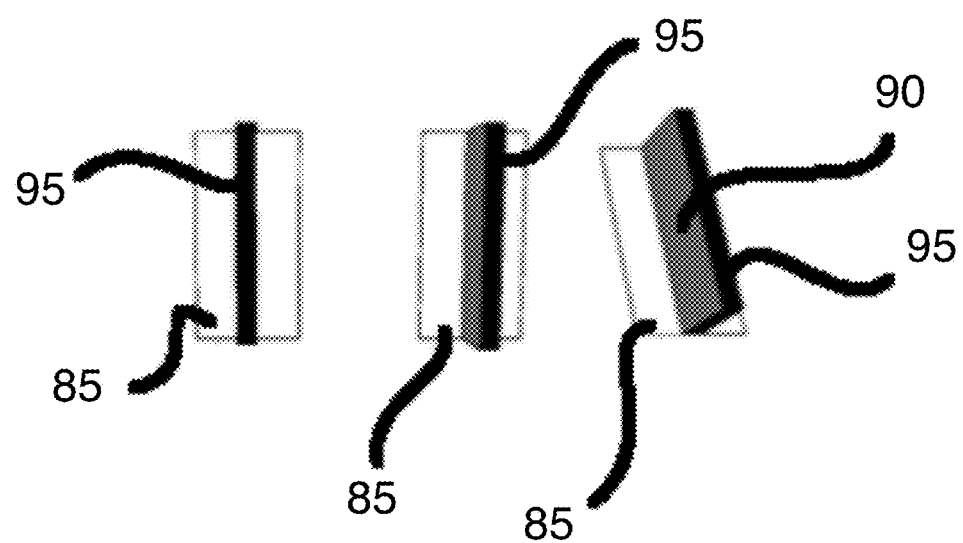

FIG. 9 exhibits a fourth alternate embodiment of the present invention having a single vertical plane which is disposed perpendicularly to a rear mounting plate.

DETAILED DESCRIPTION OF THE PRESENT INVENTION

The present specification discloses one or more embodiments that incorporate the features of the invention. The disclosed embodiment(s) merely exemplify the invention. The scope of the invention is not limited to the disclosed embodiment(s).

References in the specification to "one embodiment," "an embodiment," "an example embodiment," etc., indicate that the embodiment described may include a particular feature, structure, or characteristic, but every embodiment may not necessarily include the particular feature, structure or characteristic. Moreover, such phrases are not necessarily referring to the same embodiment, Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention is a visual aid device (60) configured to help a driver park their vehicle in the same spot in their garage each time as shown in FIGS. 1-9.

Figure 1:
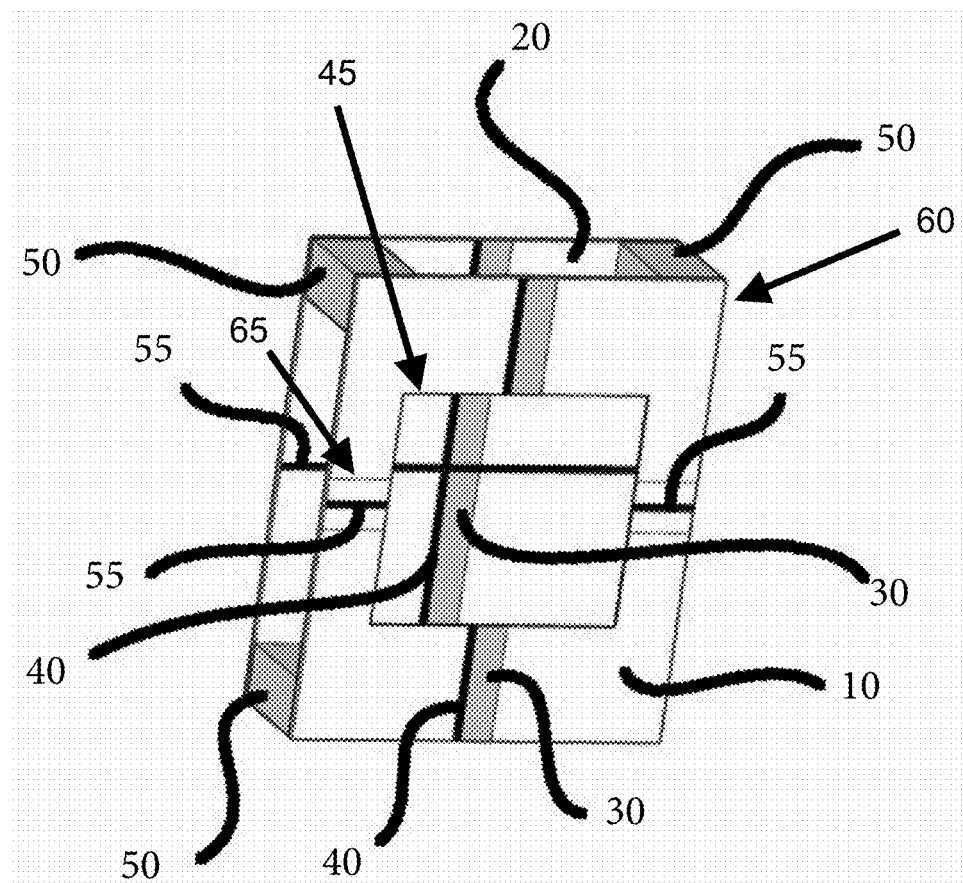
Figure 2:
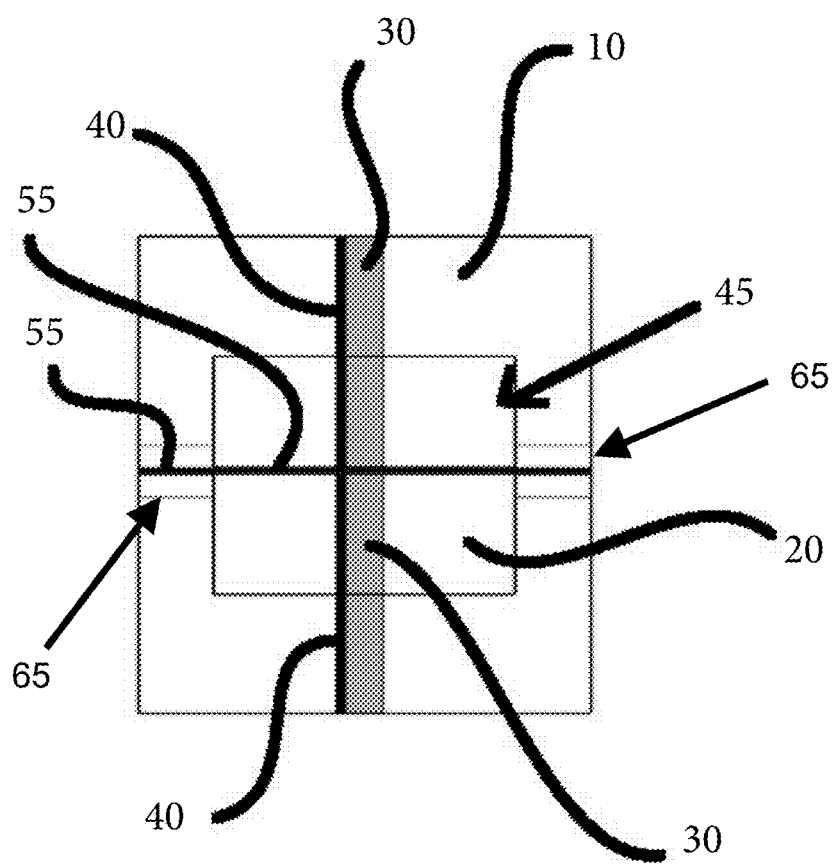
Figure 3:
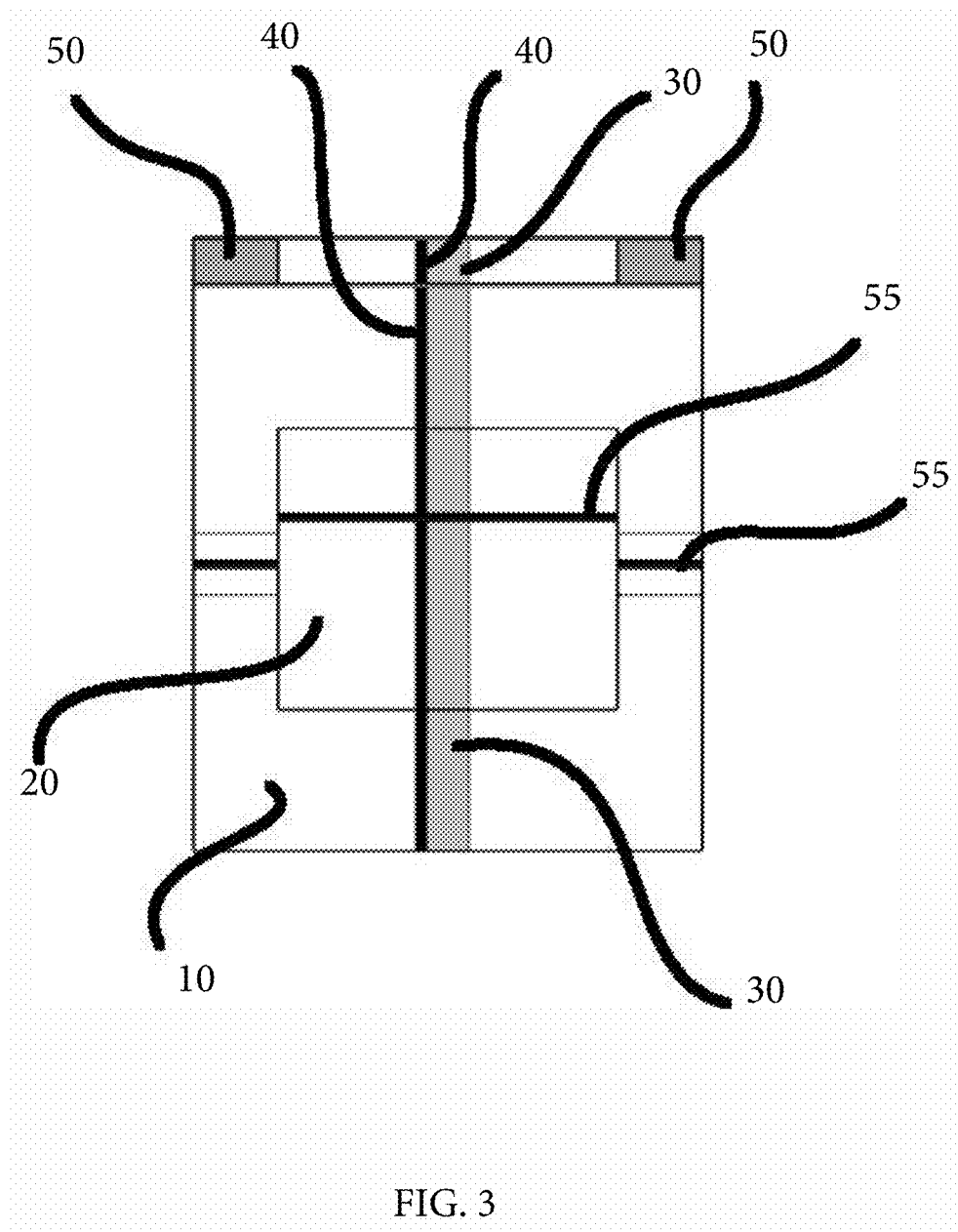

Referring to FIG. 1, the present invention is equipped with a front panel (10) and back panel (20) which are both preferably made of thin plastic, and is approximately 6" wide by 8" high. It should be noted that the front panel (10) constitutes a first planar surface, and the back panel (20) constitutes a second planar surface, each of these planar surfaces disposed on a front of each panel (10, 20). Both the front panel (10) and back panel (20) are preferably colored white, and are each equipped with a bright red stripe (30), ½" wide, painted vertically in the center, on top of the white. Immediately adjacent to the red stripe is a black stripe (40), ⅛" wide. Perpendicular to both of these stripes on the back panel (20) is horizontal black stripe (55), ⅛" wide, painted horizontally across the center of the back panel (20).

The front panel (10) has a 4"×4" square hole (45) cut through the middle of it, so the back panel can be seen behind it.

Columns (50) are preferably present between the front panel (10) and the back panel (20), separating the panels from one another while connecting them together. The columns (50) attaching the front panel (10) and rear panel (20) together are preferably 1"×1 square, 2" long, and made of plastic or cardboard. The front panel (20) has an adjustable sleeve (65) on each side with a ⅛" black horizontal line (55). For clarity, the adjustable sleeves (65) are disposed on the front panel (10) embodied in paper, plastic, cardboard, or similar light medium, on which are printed the vertical ⅛" black line. On either side of the black line are two very thin lines, depicting the edges of the adjustable sleeves (65).

If the horizontal lines are not utilized, the present invention should be used in conjunction with commercially available parking wheel stops or bumpers, so the vehicle can be parked in the correct forward position as well as the correct position side-to-side aided by proper use of the present invention.

Alternate embodiments, primarily reflecting the design of the present invention, preferably include:

1. A second embodiment equipped with a vertical slit (70) in the front panel (10) (see FIG. 7). The front panel (10) in this embodiment is preferably light in color, and the back panel (20) is a dark color with a contrasting dark stripe (80) positioned in such a way that when the vehicle is correctly parked only the contrasting dark stripe (80) will be visible through the slit (70), otherwise both dark colors, or only the secondary dark, background color will be visible.

2. A third embodiment in which a light-colored top panel (10) is shorter than a light-colored bottom panel (20) as shown in FIG. 8, with a bright vertical stripe (30) running through both in such a way that when the vehicle is correctly parked the two vertical stripes will appear as one, otherwise the stripe will look uneven or there will be two separate stripes. In contrast to the preferred embodiment of the present invention, a floating point (75) is used as a contrast against a rear mounting plate (85) as shown in FIG. 8.

3. A fourth embodiment which is equipped with a single vertical plane (90) as shown in FIG. 9. The single vertical plane (90) is disposed perpendicularly to a rear mounting plate (85) which is configured to be mounted to the wall or stationary object in the garage. The single vertical plane (90) is brightly colored on a front edge (95) and is thick enough that the one brightly colored front edge (95) can be easily seen from the entrance to the garage. The plane is mounted vertically, with the bright front edge (95) facing the driver at eye level. The rest of the vertical plane (90) is a contrasting dark color such that, when the vehicle is correctly parked, only the brightly colored front edge will be visible, otherwise the contrasting dark color of the rear mounting plate (85) will also be visible. The plane is attached perpendicular to a light-colored backing board, which itself is mounted parallel to the back of the garage.

Figure 4:
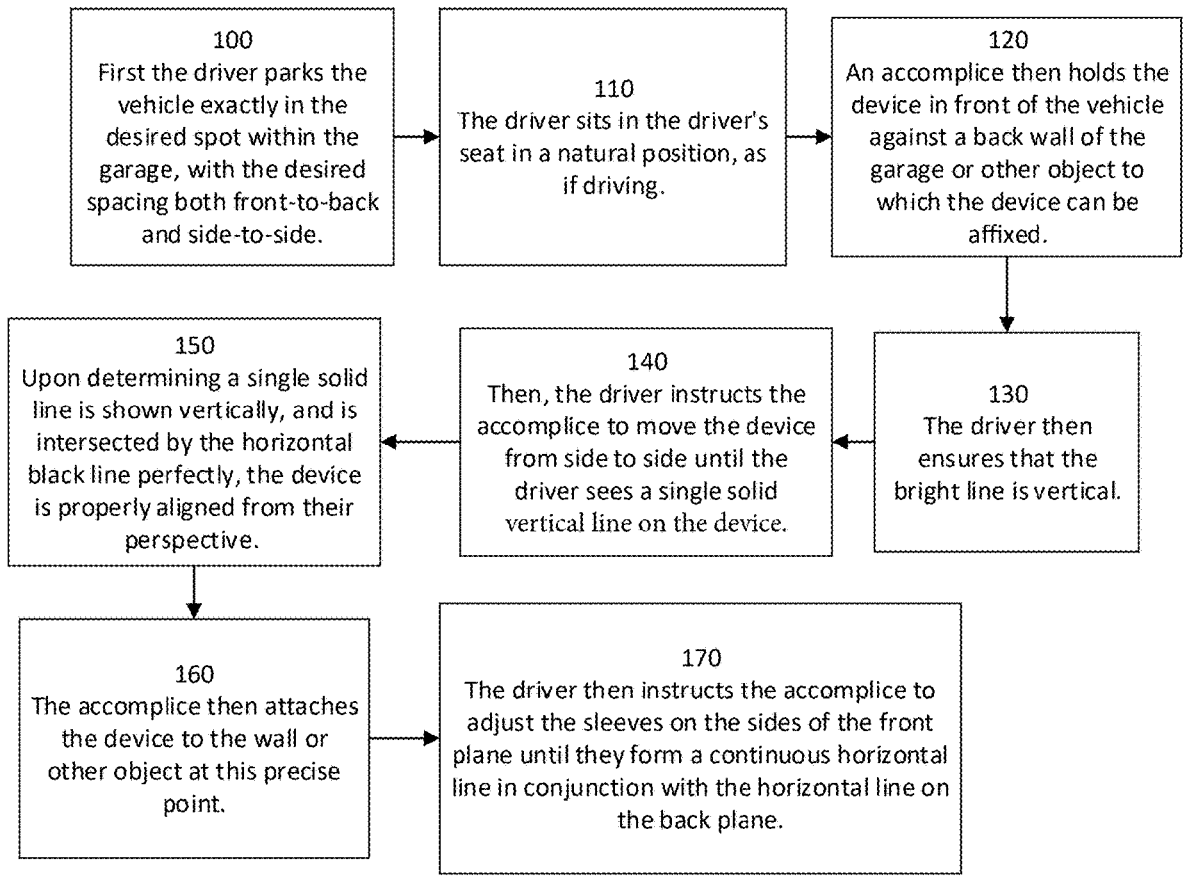
Figures 5A, 5B, 5C:
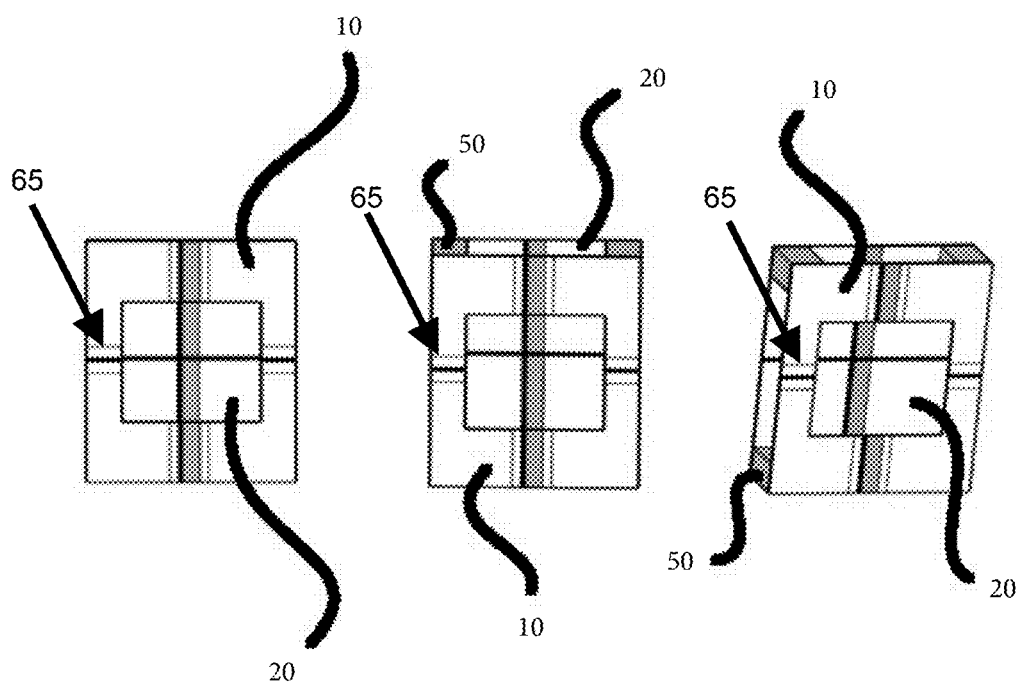
FIG. 5B depicts a view of the preferred embodiment of the present invention shown to the driver when the vehicle is parked in a position that is correct on one axis, side-to-side, but not front-to-back.
FIG. 5C depicts an a view of the preferred embodiment of the present invention shown to the driver when the vehicle is parked in a position in which both the side-to-side and the front-to-back position of the vehicle are incorrect, as denoted by both the horizontal and vertical lines being broken. It also details how the apparatus of the present invention is constructed.

As outlined in FIG. 4, the process of installation and use of the apparatus of the present invention by a user is preferably as follows:

1. First the driver parks the vehicle exactly in the desired spot within the garage. (100)
2. The driver sits in the driver's seat in a natural position, as if driving. (110)
3. An accomplice then holds the device in front of the vehicle against a back wall of the garage or other object to which the device can be affixed. (120)
4. The driver then ensures that the bright (red) line is vertical. (130) The location to which the device is affixed is parallel to the back wall of the garage, and is high enough that the driver can see it.
5. Then, the driver instructs the accomplice to move the device from side to side until the driver sees a single solid vertical line on the device. (140)
6. Upon determining a single solid vertical line is shown, the device is properly aligned from their perspective. (150)
7. The accomplice then attaches the device to the back wall or other object directly in front of the vehicle, at this precise point. (160)
8. The driver then instructs the accomplice to adjust the sleeves on the sides of the front plane until they form a continuous horizontal line in conjunction with the horizontal line on the back plane. (170)

Note that the driver can perform the functions of the accomplice by temporarily affixing the device and then adjusting it on a trial-and-error basis until the desired orientation is achieved.

It should also be noted that alternate embodiments of the present invention may exhibit different colors, textures, and patterns depicted on the front panel (10) and/or rear panel (20). Further, alternate embodiments of the present invention may exhibit a longer or shorter point (20) than shown in FIG. 8.

In short, it should be understood that the present invention is configured to be mounted on a wall or stationary object in the garage in a precise location. The device is preferably equipped with at least two stripes, perpendicular to one another, which, when both are shown in alignment with their surroundings, are configured to indicate both the lateral, side-to-side position and the front-to-back position of the vehicle. The vertical stripe is big enough that it can be used to make corrections to the vector of the vehicle before entering the garage too far, therefore requiring the driver to re-park the vehicle. The horizontal stripe helps the driver during the latter stage of the parking maneuver to pull the vehicle into the garage just the right distance.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:

1. A visual aid device for parking vehicles in a garage in a desired spot, both side-to-side, and front-to-back, by a driver disposed in a driver's seat, comprising:
    a front panel and a back panel, each made of thin plastic and being six inches wide by eight inches high;
    said front panel having a first planar surface and said back panel having a second planar surface;
    a horizontal black stripe painted across a center of said back panel;
    said front panel having a 4-inch by 4-inch square hole cut through a middle, allowing visibility of the back panel;
    wherein said first planar surface has a first vertical stripe above said hole;
    wherein said first planar surface has a first vertical red stripe above said hole;
    wherein said first planar surface has a second vertical stripe below said hole;
    wherein said first planar surface has a second vertical red stripe below said hole;
    wherein said second planar surface has a third vertical stripe;
    wherein said second planar surface has a third red vertical stripe;
    wherein said first vertical stripe is adjacent to said first vertical red stripe;
    wherein said second vertical stripe is adjacent to said second vertical red stripe;
    wherein said third vertical stripe is adjacent to said third vertical red stripe;
    columns connecting said front panel to the back panel, said columns measuring 1 inch by 1 inch and 2 inches long;
    adjustable sleeves on each side of said front panel having a ⅛-inch black horizontal line; and
    wherein the vehicle is correctly positioned in the desired spot, side-to-side, when said first vertical stripe, said second vertical stripe, and said third vertical stripe are in alignment.

2. The visual aid device of claim 1, wherein said front panel and said back panel are colored white;
    wherein said first vertical stripe, said second vertical stripe, and said third vertical stripe are each ½ inch wide; and
    wherein the horizontal black stripes are ⅛ inch wide.

3. The visual aid device of claim 1, wherein said first vertical red stripe, said first vertical black stripe, and said horizontal black stripe are disposed on both said front and said back panels; and
    wherein said first vertical stripe, said second vertical stripe, said third vertical stripe, and said horizontal black stripe are aligned such that they create a cross pattern visible to the driver when the device is viewed from directly above.

4. The visual aid device of claim 1, wherein the columns between said front and said back panels are adjustable in length to accommodate different panel thicknesses.

5. The visual aid device of claim 1, wherein said front panel is light in color and said back panel is dark in color, with the contrasting horizontal black stripe being of a color that contrasts with the color of said back panel.

6. A visual aid device for assisting in vehicle parking, comprising:

a front panel, said front panel having a width of 6 inches and a height of 8 inches;
wherein said front panel is made of plastic;
a first planar surface of said front panel, said first planar surface exhibiting a central 4-inch by 4-inch square hole cut through a middle of said front panel to provide visibility to a back panel having a second planar surface;
wherein said first planar surface has a first stripe running vertically and centrally across said first planar surface above said hole in said first planar surface;
wherein said first planar surface has a second stripe running vertically and centrally across said first planar surface below said hole in said first planar surface;
wherein said second planar surface has a third stripe, running vertically and centrally across said second planar surface;
a horizontal black stripe, said horizontal black stripe being ⅛ inch wide, disposed across said center of said back panel, perpendicular to said vertical stripes;
said back panel having the same dimensions as the front panel, mounted behind said front panel, aligned such that said central hole in said front panel exposes a central portion of said back panel;
wherein said back panel exhibits a color that contrasts with said front panel to enhance visibility of said vertical stripes on both said front panel and said back panel;
columns, said columns connecting said front panel and said back panel together;
wherein said columns are positioned at each corner between said front panel and said back panel to maintain a fixed separation between said front panel and said back panel;
adjustable sleeves, said adjustable sleeves attached to each side of the front panel containing a ⅛ inch wide horizontal stripe disposed in the center of each sleeve; and
wherein said adjustable sleeves are configured to adjust the vertical positioning of said ⅛ inch wide horizontal stripe to form a continuous line with said horizontal black stripe of said back panel when the vehicle is properly positioned front-to-back.

7. The visual aid device of claim 6 wherein the vertical and horizontal stripes are of reflective or illuminated materials for enhanced visibility in low light conditions.

8. The visual aid device of claim 6, wherein the front and back panels are made from weather-resistant plastic to ensure durability and longevity when exposed to varying environmental conditions.

9. A passive, visual device to help a vehicle driver park a vehicle in a same desired spot in a garage, both front-to back, and side-to-side, consistently over time comprising:
a first planar surface;
a second planar surface, said second planar surface disposed under said first planar surface such that the second planar surface is parallel to said first planar surface;
wherein said first planar surface is separated from said second planar surface by a minimum of ⅛ of an inch;
wherein said first planar surface contains a rectangular hole through which said second planar surface is visible;
wherein each said first planar surface and said second planar surface has a top surface and a bottom surface;
wherein said top surface of both said first planar surface and said second planar surface is colored a light color;
wherein said top surface of said first planar surface has a first stripe running vertically and centrally across said top surface above said hole in said first planar surface;
wherein said top surface of said first planar surface has a second stripe running vertically and centrally across said top surface below said hole in said first planar surface;
wherein said top surface of said second planar surface has a third stripe, running vertically and centrally across said top surface;
wherein said first stripe, said second stripe, and said third stripe appear as a single stripe when disposed at an eye level of the driver and the vehicle is in the desired spot in the garage, side-to-side; and
wherein said top surface of the first planar surface has an adjustable sleeve on each side on which is printed a horizontal line configured to line-up with a horizontal stripe on said top surface of said second planar surface.

10. The device of claim 9, further comprising:
columns, said columns joining said first planar surface and said second planar surface together such that said bright vertical stripes present on both the top surface of the first planar surface and the top surface of the second planar surface are aligned when the vehicle is parked in the desired side-to-side position;
wherein said horizontal stripe of said second planar surface and said horizontal line of said first planar surface appear as one continuous line when viewed from directly in front, indicating the vehicle is parked in the desired position front-to-back; and
wherein said first vertical stripe, said second vertical stripe, said third vertical stripe, and said horizontal stripes appear as a smooth continuous cross when the vehicle is parked in the desired position both side-to-side and front-to-back.

11. The device of claim 10, wherein said second planar surface is equipped with said rectangular hole which is centrally disposed in a vertical orientation; and
wherein said rectangular hole is oriented such that said third vertical stripe and said horizontal stripe on the second planar surface can be readily seen through the hole.

12. The device of claim 11, wherein said first vertical stripe and said second vertical stripe of said first planar surface, said third vertical stripe of said second planar surface, and said horizontal stripe with said horizontal line appear as crossed stripes when disposed at an eye level of the driver.

13. The device of claim 12, wherein the device is correctly installed in front of the driver as they sit in their vehicle which has been parked in the garage in the desired spot.

* * * * *